(12) United States Patent
Perez

(10) Patent No.: US 7,422,044 B1
(45) Date of Patent: Sep. 9, 2008

(54) MACHINE FOR ON-SITE FOLDING AND SECURING A TAPE TO AN UNFINISHED EDGE OF A CARPET

(76) Inventor: Benigno G. Perez, 2754 Mickle Ave., Bronx, NY (US) 10469

( * ) Notice: Subject to any disclaimer, the term of this patent is extended or adjusted under 35 U.S.C. 154(b) by 155 days.

(21) Appl. No.: 10/880,793

(22) Filed: Jun. 30, 2004

(51) Int. Cl.
*B32B 15/00* (2006.01)

(52) U.S. Cl. .......................... 156/443; 156/579; 428/88
(58) Field of Classification Search ................. 156/443; 428/88
See application file for complete search history.

(56) References Cited

U.S. PATENT DOCUMENTS

| | | | |
|---|---|---|---|
| 1,423,143 A | | 7/1922 | Patterson |
| 2,025,092 A | * | 12/1935 | Cooper .................... 38/77.6 |
| 2,576,621 A | * | 11/1951 | McBride et al. ............ 156/391 |
| 2,848,589 A | * | 8/1958 | Carlsen ...................... 337/386 |
| 3,523,176 A | * | 8/1970 | Hill ............................ 219/245 |
| 3,578,534 A | * | 5/1971 | Johnson ...................... 156/461 |
| 3,660,191 A | * | 5/1972 | Shimota et al. ............. 156/152 |
| 3,972,768 A | * | 8/1976 | Hill ............................ 156/545 |
| 4,029,935 A | * | 6/1977 | Archer et al. ............... 219/228 |
| 4,054,698 A | | 10/1977 | Hamrah |
| 4,349,142 A | * | 9/1982 | Soter, III ..................... 227/13 |
| 4,483,896 A | | 11/1984 | Gray et al. |
| 4,849,063 A | * | 7/1989 | McXinnon .................. 156/391 |
| 5,018,235 A | | 5/1991 | Stamatiou et al. |
| 5,028,295 A | * | 7/1991 | Cracchiolo .................. 156/574 |
| 5,045,374 A | | 9/1991 | Tucker |
| D394,776 S | | 6/1998 | Callas |
| 5,766,726 A | | 6/1998 | Bannister |
| 6,055,918 A | * | 5/2000 | Hajjar et al. .................... 112/7 |
| 6,421,939 B1 | * | 7/2002 | David et al. .................... 38/76 |
| 6,517,922 B2 | | 2/2003 | Ang et al. |
| 2004/0217107 A1 | * | 11/2004 | Goodrich et al. ............ 219/494 |

OTHER PUBLICATIONS

Instabind, WWW.INSTABIND.COM, 1-866-467-8224.
Multy-Edge, Multy Industries Inc., Atlanta, GA 30336, WWW.MULTYINDUSTRIES.COM.

* cited by examiner

*Primary Examiner*—Philip C. Tucker
*Assistant Examiner*—Kimberly K McClelland
(74) *Attorney, Agent, or Firm*—Marguerite Del Valle

(57) ABSTRACT

A machine for on-site folding and securing a tape to an unfinished edge of a carpet. A housing rolls under the carpet. A heating unit is contained in the housing and heats the tape to melt an adhesive thereon. A die is interchangeably mounted to the housing and has the tape feed therethrough to be folded and attached to the carpet by way of the melted adhesive thereon. A first embodiment of the die has spaced-apart bottom and a top walls to receive the tape therebetween. A second embodiment of the die further has a pair of flanges extending outwardly from free edges of the bottom and top walls, respectively. The pair of flanges fold inwardly onto the bottom and top walls, respectively, and are spaced a slight distance from the bottom and top walls, respectively, so as to form a pair of guides that receive the tape.

3 Claims, 4 Drawing Sheets

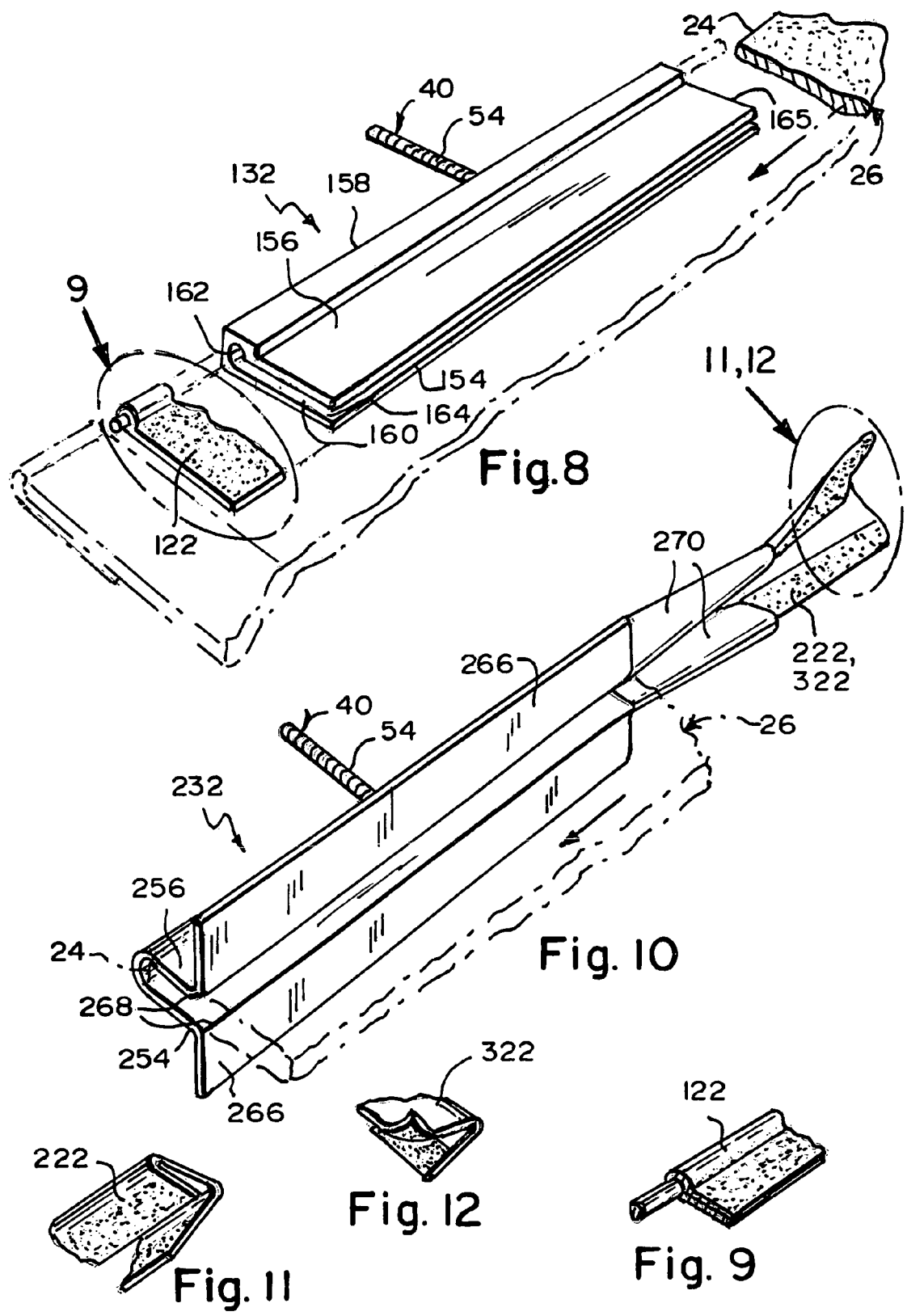

US 7,422,044 B1

MACHINE FOR ON-SITE FOLDING AND SECURING A TAPE TO AN UNFINISHED EDGE OF A CARPET

FIELD OF THE INVENTION

The present invention relates to machine, and more particularly, the present invention relates to a machine for on-site folding and securing a tape to an unfinished edge of a carpet.

DESCRIPTION OF THE PRIOR ART

Numerous innovations for finishing strips have been provided in the prior art that will be described. Even though these innovations may be suitable for the specific individual purposes to which they address, however, they differ from the present invention.

A FIRST EXAMPLE, U.S. Pat. No. 1,423,143 to Patterson teaches a strip for holding the edges of floor covering, said strip having a thin flap on the top of one edge, and a downwardly and inwardly inclined face on the other edge.

A SECOND EXAMPLE, U.S. Pat. No. 4,054,698 to Hamrah teaches carpet binding tape for providing the edge portion of floor covering with a uniform edge and including a body of adhesive material for adhesively securing the edge molding to the edge portion of the floor covering. The carpet binding tape prevents unraveling and fraying of the carpet and may be of flexible material thereby permitting the carpet to be rolled up without removal of the carpet binding tape.

A THIRD EXAMPLE, U.S. Pat. No. 4,483,896 to Gray et al. teaches a carpet seaming apparatus that includes an elongated bonding tape having an electrical resistance circuit with contacts at the edge of the tape mounted on the face thereof with a hot melt adhesive in the form of elongated beads running the length of the tape that melts in response to electrical current in the resistive conductors. A tool having spaced apart electrical contacts for engaging the contacts adjacent the edges of the tape inducing an electrical current therein for heating and melting the hot melt adhesive.

A FOURTH EXAMPLE, U.S. Pat. No. 5,018,235 to Stamatiou et al. teaches a holder for flexible material, for example a disposable floor mat, that comprises a base on which the material rests, at least part of the base having an integral wall so arranged as to form a recess. The recess is dimensioned so as to receive the material in a close fit and means are provided to hold the material in place. The holding means may comprise a lip integral with the wall of the holder which extends above the recess and means may be provided on the surface of the holder to act as a guide for the correct placement of the material. Additionally or alternatively the base of the holder may include holding means such as "Klettostop", which comprises a plurality of upwardly extending hooks or spikes formed from a plastic material. Means may also be provided for retaining the holder on a support surface.

A FIFTH EXAMPLE, U.S. Pat. No. 5,045,374 to Tucker teaches a stiff plastic strip that is formed to provide reinforcement for longitudinal edges at which interior drywall surfaces meet and for capping corners formed of sheets of wallboard meeting at orthogonal angles. A pair of laterally directed flanges extend in diverging fashion from a central transversely curved region of the plastic strip. A contact sensitive adhesive strip is mounted on each of the flanges to extend longitudinally therealong so as to allow the plastic strip to be pressed against drywall or wallboard surfaces. One of the flanges of the plastic strip may be slit periodically throughout its length to allow it conform to arches and circular openings. In another embodiment a stiff, water impervious plastic sheet with three flanges extending outwardly therefrom has contact sensitive adhesive layers disposed on each of the flanges. The structure can thereby serve as a cap for protruding soffit corners.

A SIXTH EXAMPLE, U.S. Pat. No. Des. 394,776 to Callas teaches the ornamental design for a floor mater border.

A SEVENTH EXAMPLE, U.S. Pat. No. 5,766,726 to Bannister teaches a resilient, semi-rigid molding strip for installation along an edge of an linoleum floor surface, particularly suited to installations where the edge follows a curved contour. The molding strip is formed from extruded semi-rigid vinyl. There is a horizontal top flange and a vertical web having an angled nailing surface along its lower edge. The nailing surface correctly aligns the fasteners, and the web section is drawn downwardly during installation so that the top flange is resiliently biased against the linoleum surface. The characteristics of the semi-rigid material permit the strip to be bent in the horizontal plane without buckling the top flange or footing section of the web.

AN EIGHTH EXAMPLE, U.S. Pat. No. 6,517,922 B2 to Ang, et al. teaches a kit for use in finishing a cut edge of floor coverings such as mats, carpets, carpet runners, and roll runners having a cut side edge including an elongated edging strip which has a length equal to or exceeding the length of the cut edge to be finished. The lateral width of the edging strip is selected so that when secured in place, the strip substantially covers and conceals the cut edge. The edging strip includes a flexible ribbon and an attachment member provided to permanently secure the ribbon in position substantially overlapping the cut edge. Preferably, the attachment member comprises a piece of two-sided tape having a length and width generally corresponding to that of the finishing strip. The two-sided tape is secured along a first side to the finishing strip, and a release sheet is carried by and releasably secured to the second other side of the tape. In use, the release sheet is removed to activate the adhesive tape, whereupon the second side of the tape is pressed into contact with the floor covering to secure the finishing strip or ribbon in place.

It is apparent that numerous innovations for finishing strips have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a machine for on-site folding and securing a tape to an unfinished edge of a carpet that avoids the disadvantages of the prior art.

ANOTHER OBJECT of the present invention is to provide a machine for on-site folding and securing a tape to an unfinished edge of a carpet that is simple to use.

BRIEFLY STATED, STILL ANOTHER OBJECT of the present invention is to provide a machine for on-site folding and securing a tape to an unfinished edge of a carpet. A housing rolls under the carpet. A heating unit is contained in the housing and heats the tape to melt an adhesive thereon. A die is interchangeably mounted to the housing and has the tape feed therethrough to be folded and attached to the carpet by way of the melted adhesive thereon. A first embodiment of the die has spaced-apart bottom and top walls to receive the tape therebetween. A second embodiment of the die further has a pair of flanges extending outwardly from free edges of the bottom and top walls, respectively. The pair of flanges fold inwardly onto the bottom and top walls, respectively, and are spaced a slight distance from the bottom and top walls, respectively, so as to form a pair of guides that receive the tape.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 8 is a diagrammatic perspective view of a first embodiment of the die of the present invention identified by ARROW 8 in FIG. 3;

FIG. 9 is a diagrammatic perspective view of the area generally enclosed by the dotted curve identified by ARROW 9 in FIG. 8 of a tape used with the first embodiment of the die of the present invention;

FIG. 10 is a diagrammatic perspective view of a second embodiment of the die of the present invention identified by ARROW 10 in FIG. 3; and FIGS. 11 and 12 are diagrammatic perspective views of the area generally enclosed by the dotted curve identified by ARROWS 11, 12 in FIG. 10 of tapes used with the second embodiment of the die of the present invention.

LIST OF REFERENCE NUMERALS UTILIZED IN THE DRAWING

Figure 1:
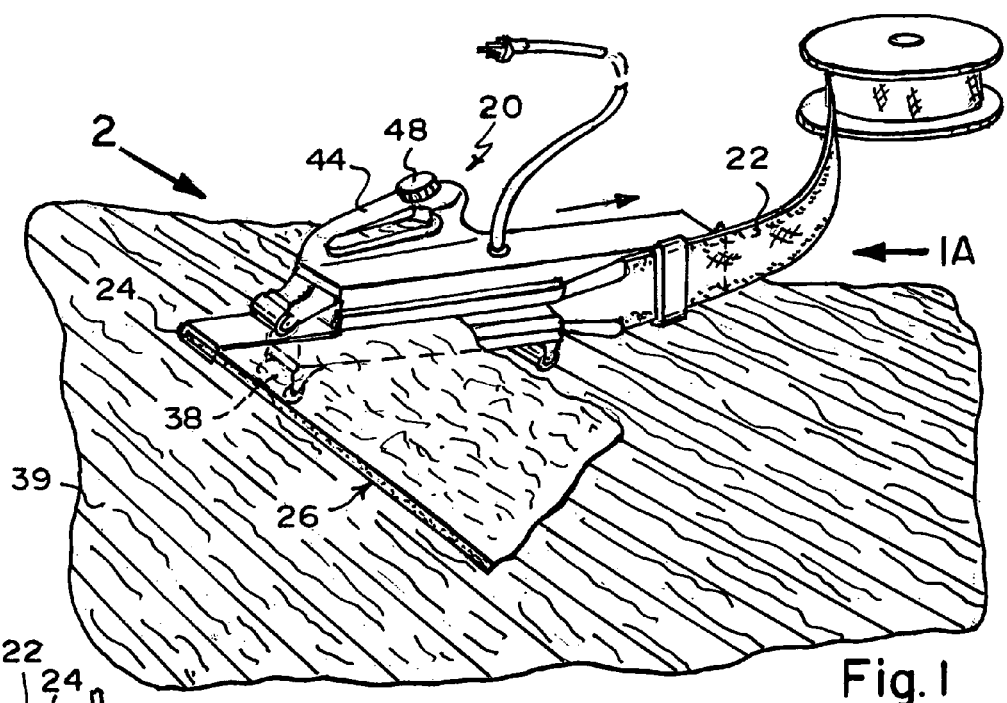
FIG. 1 is a diagrammatic perspective view of a first embodiment of the present invention in use.

| 20 | machine of present invention for on-site folding and securing tape 22 to unfinished edge 24 of carpet 26 |
|---|---|
| 22 | tape |
| 24 | unfinished edge of carpet 26 |
| 26 | carpet |
| 28 | housing for rolling under carpet 26 |
| 30 | heating unit for heating tape 22 to melt adhesive (not shown) thereon |
| 32 | die for having tape 22 feed therethrough to be folded and attached to carpet 26 by way of melted adhesive (not shown) thereon |
| 34 | body of housing 28 |
| 38 | at least one roller of body 34 for rolling under carpet 26 |

-continued

| 39 | floor |
|---|---|
| 40 | apparatus of body 34 |
| 42 | top surface of body 34 of housing 28 |
| 44 | handle of housing 28 |
| 46 | heating element of heating unit 30 for melting adhesive (not shown) of tape 22 as tape 22 passes through die 32 |
| 48 | heater control of heating unit 30 |
| 50 | on/off switch of heating unit 30 |
| 52 | bi-metallic strip of heating unit 30 for providing maximum for heat |
| 54 | threaded rod of apparatus 40 |
| 56 | blind slot in body 34 of housing 28 of apparatus 40 |
| 58 | through bore centrally through blind slot 56 in body 34 of housing 28 of apparatus 40 |
| 60 | wing nut of apparatus 40 |

First Embodiment of Die 132

| 122 | tape for use with die 132 |
|---|---|
| 154 | bottom wall |
| 156 | top wall |
| 158 | common edge of bottom wall 154 and top wall 156 |
| 160 | space between bottom wall 154 and top wall 156 |
| 162 | inner portion of space 160 between bottom wall 154 and top wall 156 |
| 164 | outer portion of space 160 between bottom wall 154 and top wall 156 |
| 165 | one end of die 132 |

Second Embodiment of Die 232

| 222 | tape for use with die 232 |
|---|---|
| 254 | bottom wall |
| 256 | top wall |
| 266 | pair of flanges |
| 268 | free edge |
| 270 | pair of guides for receiving tape 222 or 322 |
| 322 | tape for use with die 232 |

DETAILED DESCRIPTION OF THE PREFERRED EMBODIMENT

Figure 2:
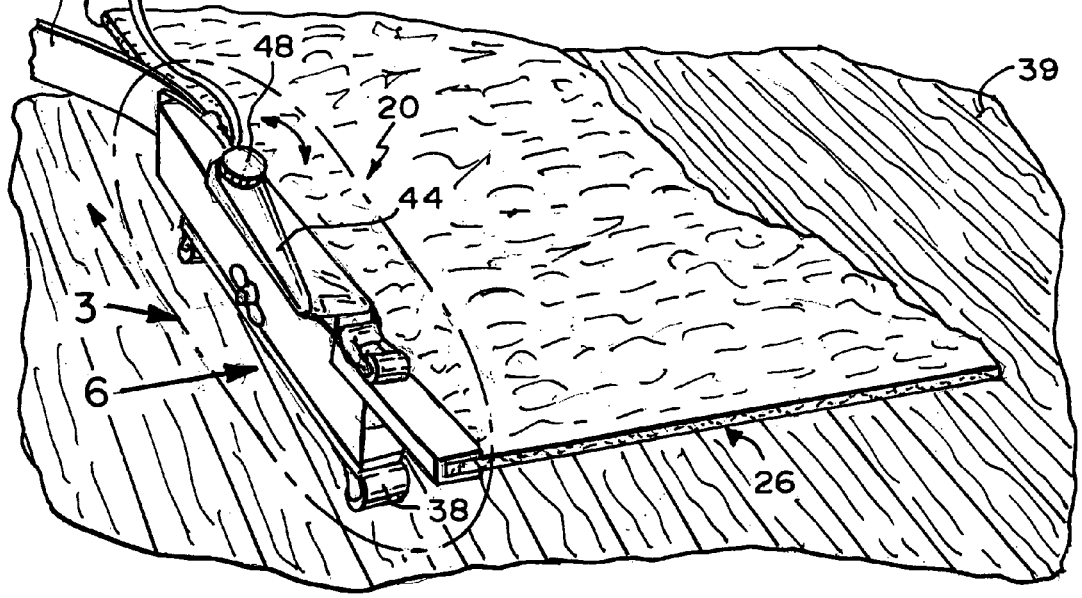
FIG. 2 is a diagrammatic perspective view taken generally in the direction of arrow 2 in FIG. 1.
Figure 1A:
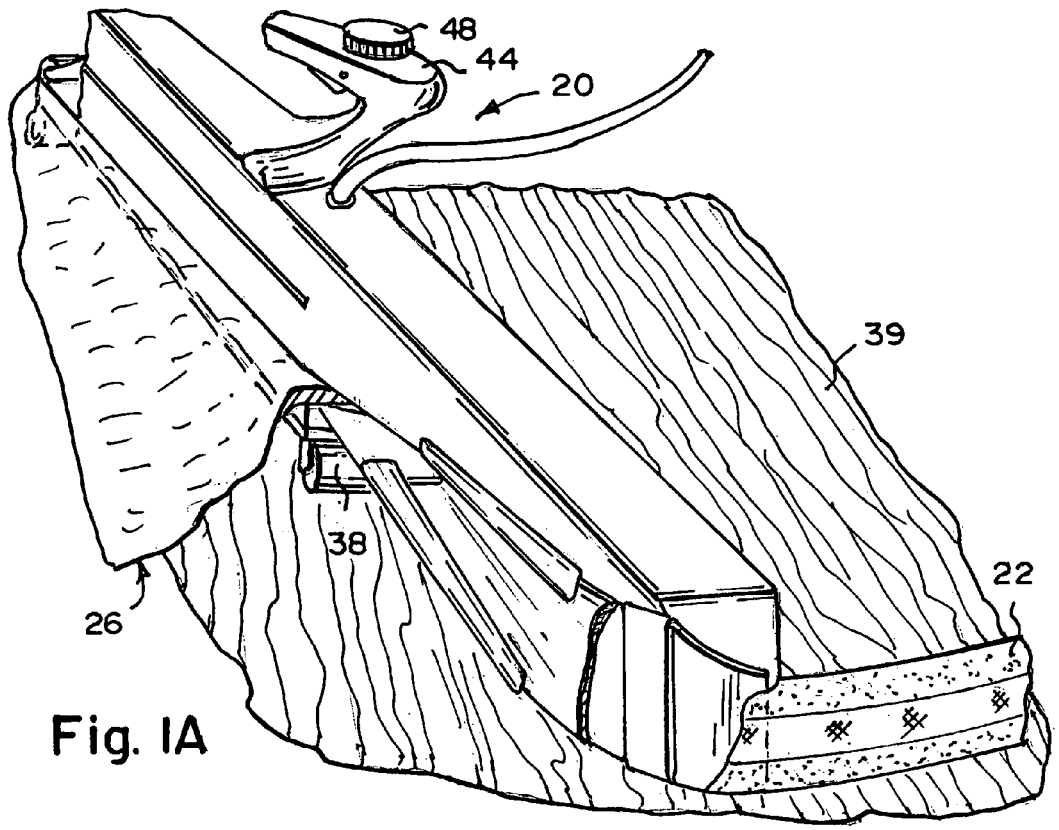
FIG. 1A is a another diagrammatic perspective view of a second embodiment of the present invention, with parts broken away taken in the direction of arrow 1A in FIG. 1.

Referring now to the figures, in which like numerals indicate like parts, and particularly to FIGS. 1, 1A and 2, the machine of the present invention is shown generally at 20 for on-site folding and securing a tape 22 to an unfinished edge 24 of a carpet 26.

Figure 3:
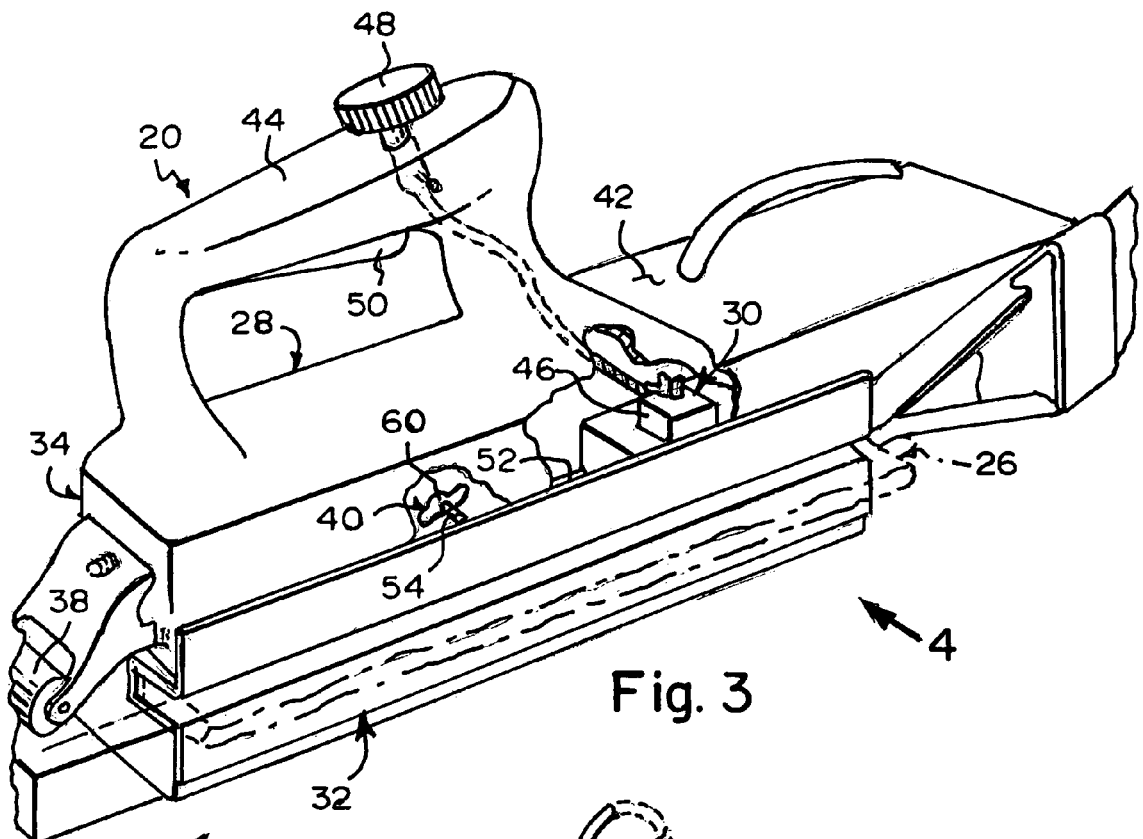
FIG. 3 is an enlarged diagrammatic perspective view of the area generally enclosed by the dotted curve identified by ARROW 3 in FIG. 2 of the first embodiment of the present invention.

The overall configuration of the machine 20 can best be seen in FIG. 3, and as such, will be discussed with reference thereto.

The machine 20 comprises a housing 28, a heating unit 30, and a die 32. The housing 28 is for rolling under the carpet 26. The heating unit 30 is contained in the housing 28 and is for heating the tape 22 to melt an adhesive (not shown) thereon. The die 32 is interchangeably mounted to the housing 28 and is for having the tape 22 feed therethrough to be folded and attached to the carpet 26 by way of the melted adhesive (not shown) thereon.

The specific configuration of the housing 28 can best be seen in FIG. 3, and as such, will be discussed with reference thereto.

The housing 28 has a body 34, at least one roller 38, and apparatus 40.

The body 34 of the housing 28 is elongated and slender, and has a top surface 42 from which a handle 44 upwardly extends.

The at least one roller 38 of the housing 28 depends from the body 34 of the housing 28 and is for rolling under the carpet 26.

The apparatus 40 of the housing 28 interchangeably mounts the die 32 to the body 34 of the housing 28.

Figure 4:
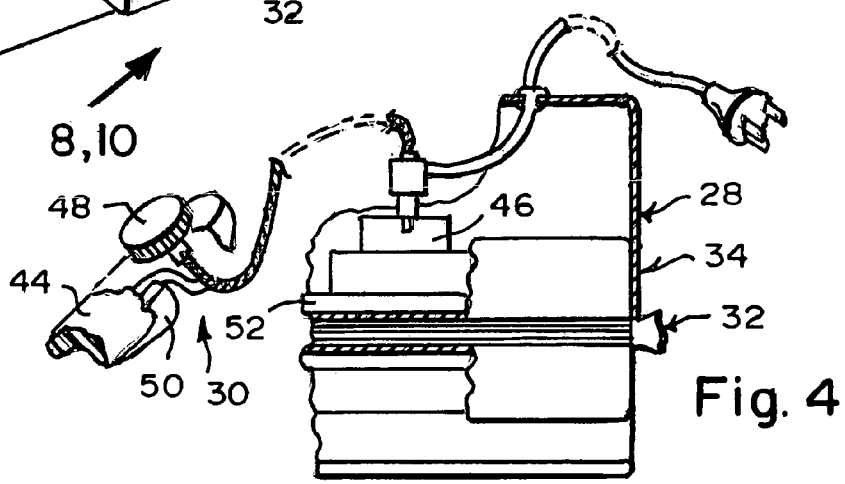
FIG. 4 is an enlarged partially sectioned diagrammatic side elevational view of a heating unit of the present invention identified by ARROW 4 in FIG. 3.
Figure 5:
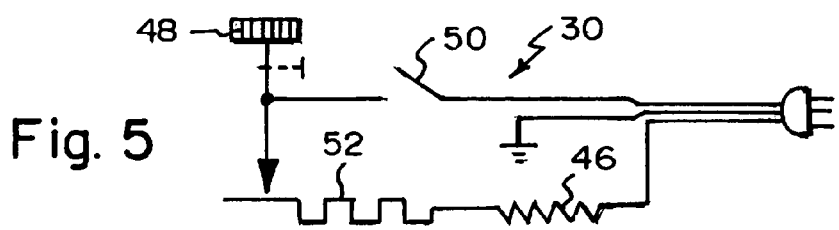
FIG. 5 is a schematic diagram of the heating unit of the present invention.

The specific configuration of the heating unit 30 can best be seen in FIGS. 3-5, and as such, will be discussed with reference thereto.

The heating unit 30 comprises a heating element 46, a heater control 48, an on/off switch 50, and a bi-metallic strip 52.

The heating element 46 of the heating unit 30 is contained in the body 34 of the housing 28, and is operatively connected to the die 32 for melting the adhesive (not shown) of the tape 22 as the tape 22 passes through the die 32.

The bi-metallic strip 52 of the heating unit 30 is contained in the body 34 of the housing 28, is operatively connected to the heating element 46 of the heating unit 30, and is for providing a maximum for heat.

The on/off switch 50 of the heating unit 30 depends from the handle 44 of the housing 28, is operatively connected to the heater control 48 of the heating unit 30, and turns the heating unit 30 on and off.

The heater control 48 of the heating unit 30 is disposed on the handle 44 of the housing 28, is operatively connected to the bi-metallic strip 52 of the heating unit 30, and controls amount of heat produced by the heater element 46 of the heating unit 30 by adjusting a deflection space of the bi-metallic strip 52 of the heating unit 30.

The specific configuration of a first embodiment of the die 132 can best be seen in FIGS. 8 and 9, and as such, will be discussed with reference thereto.

The die 132 is slender and elongated, and has a bottom wall 154 and a top wall 156. Each of the bottom wall 154 of the die 132 and the top wall 156 of the die 132 are flat and attached to each other at a common edge 158 so as to be parallel to each other and form a space 160 therebetween.

The space 160 between the bottom wall 154 of the die 132 and the top wall 156 of the die 132 has an inner portion 162 and an outer portion 164. The inner portion 162 of the space 160 in the die 132 is circular in lateral cross section and the outer portion 164 of the space 160 in the die 132 is rectangular in lateral cross section, is narrower than the inner portion 162 of the space 160 in the die 132, extends from, and communicates with, the inner portion 162 of the space 160 in the die 132, and terminates open for receipt of the unfinished edge 24 of the carpet 26.

The first embodiment of the tape 122 for use with the die 132 is described in applicant's U.S. Pat. No. 6,974,616 which is incorporated herein by reference thereto.

The tape 122 is fed into the space 160 in the die 132 from one end 165 of the die 132.

The specific configuration of a second embodiment of the die 232 can best be seen in FIGS. 10-12, and as such, will be discussed with reference thereto.

The die 232 is similar to the die 132 but with the addition of a pair of flanges 266. The pair of flanges 266 of the die 232 extend outwardly from free edges 268 of the bottom wall 254 of the die 232 and the top wall 256 of the die 232, respectively, and are flat and coplanar with each other.

The pair of flanges 266 of the die 232 fold inwardly onto, but spaced a slight distance from, the bottom wall 254 of the die 232 and the top wall 256 of the die 232, respectively, so as to form a pair of guides 270 for receiving the tape 222 or 322.

The pair of guides 270 of the die 232 flare outwardly from the bottom wall 254 of the die 232 and the top wall 256 of the die 232, respectively, for facilitating insertion of the tape 222 or 322 therein.

The second and third embodiments of the tape 222 and 322 for use with the die 232 is described in applicant's U.S. Pat. No. 6,974,616 which is incorporated herein by reference thereto.

Figure 6:
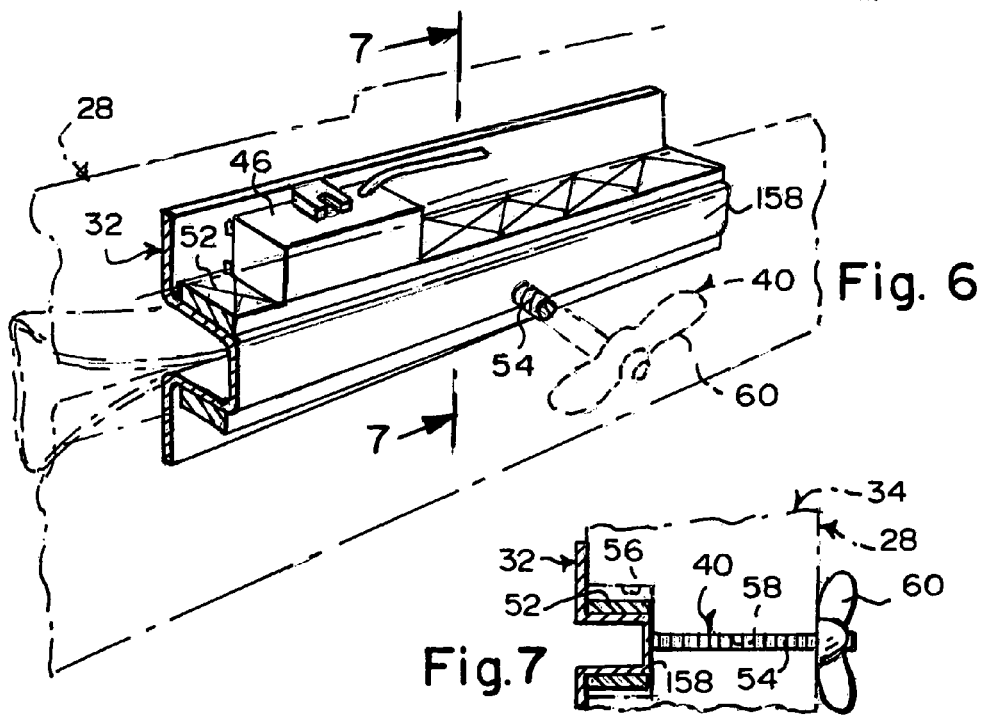
FIG. 6 is an enlarged diagrammatic perspective view of a die attaching apparatus of the present invention identified by ARROW 6 in FIG. 2.
Figure 7:
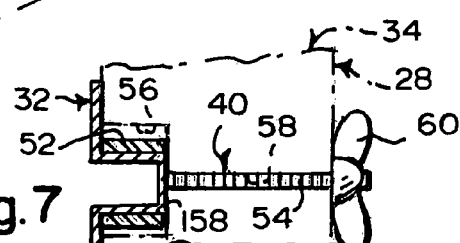
FIG. 7 is a diagrammatic cross sectional view taken along LINE 7-7 in FIG. 6.

The specific configuration of the apparatus 40 can best be seen in FIGS. 6 and 7, and as such, will be discussed with reference thereto.

The apparatus 40 comprises a threaded rod 54. The threaded rod 54 of the apparatus 40 extends outwardly from the common edge 158 of the die 32, midway therealong.

The apparatus 40 further comprises the body 34 of the housing 28 having a blind slot 56 extending longitudinally therealong and a through bore 58 centrally therethrough.

The die 32 is received in the blind slot 56 in the body 34 of the housing 28, with the threaded rod 54 extending in the through bore 58, and extending out of, the body 34 of the housing 28 and threadably engaging a wing nut 60 which tightens the die 32 in the blind slot 56 in the body 34 of the housing 28.

It will be understood that each of the elements described above, or two or more together, may also find a useful application in other types of constructions differing from the types described above.

While the invention has been illustrated and described as embodied in a machine for folding and securing a tape to an unfinished edge of a carpet, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A machine for binding carpet edges comprising:
   a. a housing having (i) a channel therethrough wherein the channel has a height and a length, a top surface, a bottom surface, an interior side surface, an open side, and a first and a second open end, wherein the top surface is separated from the bottom surface by the height of the channel and the top surface, the bottom surface, and the interior side surface are of the length of the channel; (ii) a first metal lining on the top surface of the channel and a second metal lining on the bottom surface of the channel; (iii) a heating unit disposed within the housing and operatively connected to the linings of the channel; (iv) a handle disposed on an outer surface of the housing; and
   b. an elongated metal die comprised of a metal sheet bent into a shape having a first long wall and a second long wall joined to each other by a curved portion and each long wall having a long edge of the same length as the channel, said die configured to fit within the channel such that an outer surface of the curved portion abuts the interior side surface of the channel and the first and second long walls are in contact with the metal linings of the top and bottom surfaces of the channel.

2. A machine according to claim 1 further comprising a first elongated flange extending from the long edge of the first long wall and parallel thereto and a second elongated flange extending from the long edge of the second long wall and parallel thereto.

3. A machine according to claim 2 wherein the first long wall is of a first width and the second long wall is of a second width, and the first width is equal to the second width.

* * * * *